(12) United States Patent
Hille et al.

(10) Patent No.: US 7,967,384 B2
(45) Date of Patent: Jun. 28, 2011

(54) FITTING FOR A VEHICLE SEAT

(75) Inventors: Gunther Hille, Remscheid (DE); Uwe Assmann, Remscheid (DE)

(73) Assignee: KEIPER GmbH & Co. KG, Kaiserslautern (DE)

( * ) Notice: Subject to any disclaimer, the term of this patent is extended or adjusted under 35 U.S.C. 154(b) by 197 days.

(21) Appl. No.: 12/307,292

(22) PCT Filed: Jan. 26, 2008

(86) PCT No.: PCT/EP2008/000607
§ 371 (c)(1),
(2), (4) Date: Jan. 2, 2009

(87) PCT Pub. No.: WO2008/101584
PCT Pub. Date: Aug. 28, 2008

(65) Prior Publication Data
US 2010/0060063 A1    Mar. 11, 2010

(30) Foreign Application Priority Data

Feb. 21, 2007   (DE) .......................... 10 2007 009 172

(51) Int. Cl.
*B60N 2/02* (2006.01)
*E05D 7/06* (2006.01)
(52) U.S. Cl. ..................................... 297/361.1; 16/239

(58) Field of Classification Search ............. 297/354.12, 297/361.1; 16/239
See application file for complete search history.

(56) References Cited

U.S. PATENT DOCUMENTS

| 6,261,701 B1 | 7/2001 | Fields, Jr. |
| 7,497,520 B2 * | 3/2009 | Assmann .................. 297/367 R |
| 2007/0035168 A1 * | 2/2007 | Assmann ...................... 297/353 |

FOREIGN PATENT DOCUMENTS

| DE | 199 61 696 C1 | 4/2001 |
| DE | 101 05 282 A1 | 8/2002 |
| DE | 101 29 430 C1 | 12/2002 |
| DE | 10 2004 018744 | 9/2005 |
| DE | 20 2006 011876 | 12/2007 |
| JP | 07 016776 | 1/1995 |

* cited by examiner

*Primary Examiner* — Milton Nelson, Jr.
(74) *Attorney, Agent, or Firm* — McGlew and Tuttle, P.C.

(57) ABSTRACT

A fitting (5) for a vehicle seat, in particular for a motor vehicle seat, includes a first fitting part (11), a second fitting part (12) which is rotatable about an axis (A) relative to the first fitting part (11), and with a ring (13) which keeps the two fitting parts (11, 12) together in the axial direction. The fitting (5) forms a disc-shaped unit, wherein an adaptor (21) is provided. The adaptor (21) bears against the first fitting part (11), in particular in an abutting manner, and, with the bearing contact, defines a connecting surface (F). The adapter (21) IS connected to the first fitting part (11) and/or the ring (13) by a weld seam (23). The weld seam (23) is produced from a direction (S) which runs within the connecting surface (F) or at a shallow angle (f) to the connecting surface (F).

20 Claims, 1 Drawing Sheet

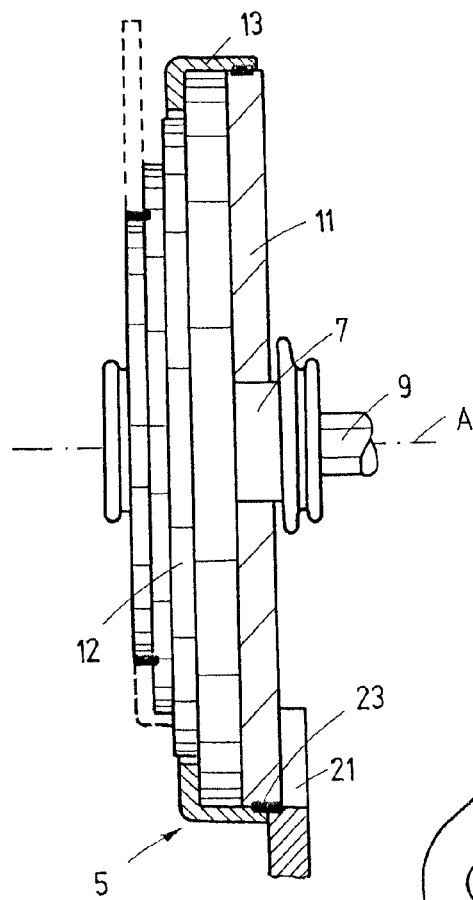
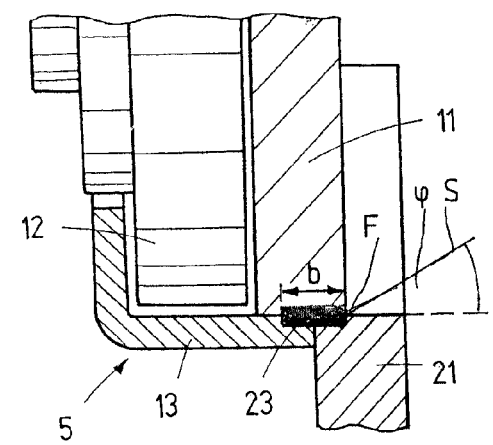
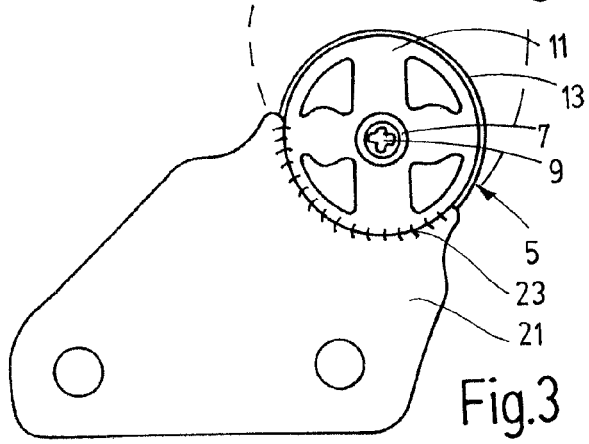
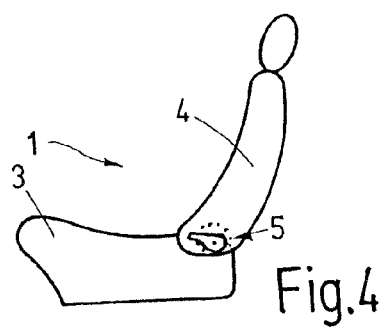
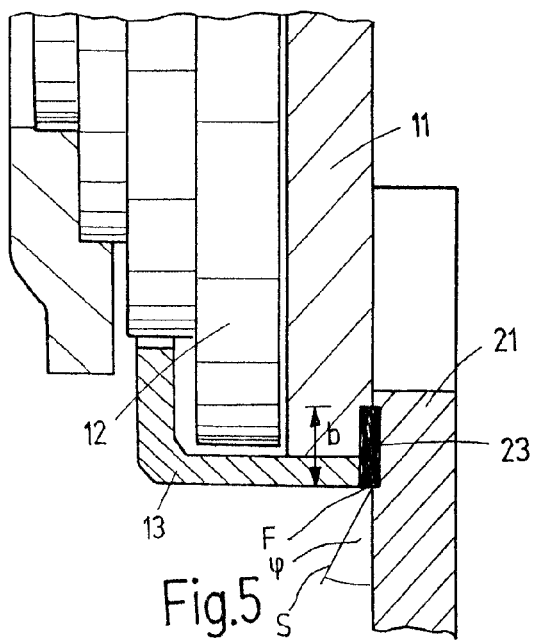
Fig.1
Fig.2
Fig.3
Fig.4
Fig.5

FITTING FOR A VEHICLE SEAT

CROSS REFERENCE TO RELATED APPLICATIONS

This application is a United States National Phase application of International Application PCT/EP2008/000607 and claims the benefit of priority under 35 U.S.C. §119 of German Patent Application DE 10 2007 009 172.0 filed Feb. 21, 2007, the entire contents of which are incorporated herein by reference.

FIELD OF THE INVENTION

The invention relates to a fitting for a vehicle seat, in particular a motor vehicle seat, with the fitting including a first fitting part, a second fitting part which may be rotated relative to the first fitting part about an axis and a ring holding together the two fitting parts in the axial direction, as a result of which the fitting forms a disc-shaped unit that cooperates with an adapter provided which bears against the first fitting part.

BACKGROUND OF THE INVENTION

In a fitting of this type known from DE 101 05 282 A1, the first fitting part, the ring and the adapter are connected to one another by means of a common weld seam. The weld seam is produced, for example, by a laser beam which is aligned in the axial direction perpendicular to the connecting surface and targets the abutment between the first fitting part and the ring located behind the adapter. Accordingly, the weld seam penetrates the adapter and then extends between the first fitting part and the ring.

SUMMARY OF THE INVENTION

The object of the invention is to improve further a fitting of the aforementioned type. This object is achieved according to the invention.

According to the invention a fitting for a vehicle seat is provided, in particular for a motor vehicle seat. The fitting comprises a first fitting part, a second fitting part rotatable relative to said first fitting part about an axis, a ring holding together said first fitting part and said second fitting part in the axial direction to form a disc-shaped unit, an adapter bearing against said first fitting part in an abutting manner to define a connecting surface and a weld seam connecting the adapter to at least one of the first fitting part and the ring. The weld has a weld seam generation direction extending along the connecting surface or at a shallow angle relative to the connecting surface.

According to another aspect of the invention, a vehicle seat is provided comprising a seat part a backrest, which is pivotable relative thereto to said seat part about the an axis and a fitting, as discussed above, for pivoting the backrest.

The connecting surface is provided by the bearing contact of the adapter against the first fitting part, i.e. the contact between the adapter and the first fitting part is made within the connecting surface. As the weld seam is produced from one direction which extends within the connecting surface or at a shallow angle to the connecting surface, through-welding of the adapter and thus melting of material, which makes no contribution to the loading capacity of the structure, is avoided. The dimension in the connecting surface which is relevant for the load bearing capacity is thus not the width of the seam but the depth of the weld seam, which preferably is substantially greater than the width of the seam. An adaptation of this dimension in the connecting surface to the anticipated loads may—with an unmodified laser welding installation—be carried out, for example, by the welding speed in the peripheral direction which determines the dwell time at a specific point. A shallow angle is intended to be understood as angles of up to 25°, i.e. between 0° and 25°. When the angle is 0°, the weld seam is produced from a direction within the connecting surface.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

The invention is described hereinafter in more detail with reference to two exemplary embodiments shown in the drawing, in which:

FIG. 1 is a partially sectioned side view of the first exemplary embodiment;

FIG. 2 is an enlarged partial view of FIG. 1;

FIG. 3 is a side view offset relative to FIG. 1 by 90°;

FIG. 4 is a schematic view of a vehicle seat; and

FIG. 5 is a partially sectioned partial view of the second exemplary embodiment.

DESCRIPTION OF THE PREFERRED EMBODIMENTS

Referring to the drawings in particular, a vehicle seat 1 for a motor vehicle has a seat part 3 and a backrest 4 which is pivotably attached on both vehicle seat sides by means of one respective fitting 5 relative to the seat part 3 about an axis A. Each fitting 5 comprises a central rotatable drive element 7, the two drive elements 7 of the two fittings 5 being operatively connected to one another by means of a profiled shaft 9. The shaft 9 arranged on the axis A may be rotated manually by means of a handwheel or lever or in a motorized manner about the axis A, as a result of which one respective rotation of the drive element 7 takes place. The directional information used hereinafter refers to the cylindrical coordinate system, which is defined by the shaft 9 arranged horizontally and transversely to the direction of travel and/or the axis A thereof.

Each fitting 5 further comprises a first fitting part 11 and a second fitting part 12 which is rotatable relative to the first fitting part 11. The fitting 5 may be configured as a detent fitting, the two fitting parts 11 and 12 then being locked to one another and a rotation of the drive element 7 unlocking the fitting 5. The fitting 5 may alternatively be configured as a geared fitting, the two fitting parts 11 and 12 then being connected to one another by a gear mechanism for adjustment and fixing in position and a rotation of the drive element 7 driving the fitting 5, for example effecting a relative rolling movement of the two fitting parts 11 and 12.

Both fitting parts 11 and 12 have a disc-shaped basic shape with a cylindrical outer peripheral surface. In the present case, a ring 13 is pressed or shrink-fitted in the axial direction onto the first fitting part 11, i.e. fixedly connected thereto. The ring 13 encompasses the second fitting part 12 by means of an edge region facing radially inward. The ring 13 thus clasps the two fitting parts 11 and 12 and holds the two together in the axial direction. Thus the two fitting parts 11 and 12 are secured in the axial direction, at least for transportation, before the assembly of the vehicle seat 1 in the motor vehicle. Overall, therefore, the fitting 5 forms a disc-shaped unit in terms of structure.

The attachment of the fitting 5 to the seat part 3 takes place by means of an adapter 21. In the present case, the adapter 21 is of fork-shaped configuration, and has a receiver. The adapter 21 is placed on the first fitting part 11 and simultaneously on the ring 13. The connecting surface, extended into infinity and defined by the contact between the first fitting part 11 and the adapter 21, is denoted by F. The adapter 21, the first fitting part 11 and the ring are fixedly connected to one another by means of a weld seam 23, whereby the fitting 5 is also secured in the axial direction against crash forces. The weld seam 23 may, for example, be produced by laser welding, electron beam welding or Wolfram-inert gas welding. The weld seam 23 runs at least approximately around the axis A in the peripheral direction and connects all three components together in the peripheral region, in which the adapter 21 is present, the weld seam 23 possibly being able to be interrupted. In a modified embodiment, the weld seam 23 may oscillate about a circular line, and thus may be configured to be continuous or interrupted, so that if required the three components, generally however only two, are connected to one another in certain places.

In a first embodiment, the (internal) diameter of the receiver 21a of the adapter 21 corresponds to the (external) diameter of the first fitting part 11. The adapter 21 may, therefore, be pushed on with its receiver onto the first fitting part 11, until it comes to bear against the front face of the ring 13. The connecting surface F is thus a cylindrical outer surface and extends in the peripheral direction and in the axial direction. The weld seam 23 is produced from a direction S, which extends within the connecting surface F or at a shallow angle φ of up to ±25° thereto. The laser beam, electron beam or generally the welding device thus targets the abutment between the adapter 21 and the first fitting part 11 at ±25° in the axial direction. An angle φ which is different from zero is then selected when projecting material parts, for example of the adapter 21, prevent the beam which has been produced from being aligned within the connecting plane F. The weld seam 23 extends within the connecting surface F further into the abutment between the ring 13 and the first fitting part 11, said weld seam being virtually drawn into this region when produced, even when the direction S of the beam being produced is at a shallow angle to the connecting plane F. In the peripheral region, in which the adapter 21 is not present, the weld seam 23 only connects the first fitting part 11 to the ring 13.

In a second embodiment the (internal) diameter of the receiver of the adapter 21 is smaller than the (external) diameter of the first fitting part 11. The adapter 21 may, therefore, be placed laterally on the first fitting part 11 in the axial direction. The connecting surface F is, therefore, a plane and extends in the radial direction and in the peripheral direction. Preferably, the ring 13 is dimensioned in the axial direction such that it also reaches as far as the connecting surface F. The weld seam 23 is produced from a direction S, which extends within the connecting surface F or at a shallow angle φ of up to ±25° thereto. The laser beam, electron beam or generally the welding device thus targets the abutment between the adapter 21 and the first fitting part 11 at ±25° in the radial direction and preferably at the same time the abutment between the adapter 21 and the ring 13 positioned therebehind. The weld seam 23 therefore extends—for the same reasons as in the first embodiment—within the connecting surface F.

The load-bearing dimension b of the weld seam 23 which is relevant for the load bearing capacity is the dimension within the connecting surface F which is different from the peripheral direction, and is thus generally measured perpendicular to the peripheral direction. In both exemplary embodiments, the dimension b of the weld seam 23 in the connecting surface F, i.e., in the present case the depth of the seam, is markedly greater than the dimension extending perpendicular thereto and different from the peripheral direction, i.e. in the present case the width of the seam. The load bearing capacity is optimized thereby. At the same time, the amount of material to be melted is as small as possible. The dimension b of the weld seam 23 in the connecting surface F is independent of the beam source and the optical system or the like used, and may be adapted to the structural requirements by varying the welding speed where the installation parameters are otherwise the same.

The second fitting part 12 is connected, preferably welded, to the structure of the backrest 4.

While specific embodiments of the invention have been shown and described in detail to illustrate the application of the principles of the invention, it will be understood that the invention may be embodied otherwise without departing from such principles.

The invention claimed is:

1. A fitting for a motor vehicle seat, the fitting comprising:
a first fitting part comprising a cylindrical outer first fitting surface;
a second fitting part which may be rotated relative to the first fitting part about an axis;
a ring holding together the two fitting parts in an axial direction to form a disc-shaped unit, said ring comprising a cylindrical inner ring surface, said cylindrical inner ring surface being arranged opposite at least a portion of said cylindrical outer first fitting surface;
an adapter, at least a portion of said adapter bearing against at least a portion of said cylindrical outer first fitting surface of the first fitting part, in an abutting manner to define an at least partially cylindrical connecting surface, the adapter being connected to one or more of the first fitting part and the ring by means of a weld seam, said weld seam being produced from one of a direction which direction extends within the connecting surface and at a shallow angle relative to the connecting surface, said weld seam extending along at least a portion of said at least partially cylindrical connecting surface.

2. The fitting as claimed in claim 1, wherein the connecting surface extends in a peripheral direction and in the axial direction relative to the axis, at least a portion of said weld seam being located between said at least said portion of said cylindrical outer first fitting surface, at least a portion of said cylindrical inner ring surface and said at least said portion of said adapter.

3. The fitting as claimed in claim 1, wherein a dimension of the weld seam in the connecting surface is greater than a dimension of the weld seam extending perpendicular thereto and different from a dimension of the weld seam in a peripheral direction.

4. The fitting as claimed in claim 1, wherein the first fitting part, the ring and the adapter are mutually connected to one another by means of the weld seam, said weld seam engaging at least a portion of said cylindrical inner ring surface, at least a portion of said cylindrical outer first fitting surface and at least a portion of said adapter.

5. The fitting as claimed in claim 1, wherein the weld seam is produced by a laser beam or electron beam, which targets the abutment between the adapter and the first fitting part from a direction within the connecting surface or at the shallow angle thereto.

6. The fitting as claimed in claim 1, wherein the shallow angle is up to ±25° with respect to the connecting surface.

7. The fitting as claimed in claim 1, wherein the ring is pressed onto the first fitting part.

8. The fitting as claimed in claim 1, wherein the ring encompasses the second fitting part.

9. The fitting as claimed in claim 1, wherein the adapter has a receiver, a diameter thereof corresponding to the diameter of the first fitting part.

10. The fitting as claimed in claim 1, wherein the adapter which is fixedly connected to the first fitting part fastens the fitting to a structure of a seat part of the vehicle seat and the second fitting part is used for fastening the fitting to a structure of a backrest of the vehicle seat.

11. A vehicle seat comprising:
a seat part;
a backrest pivotable relative to said seat part about an axis; and
a fitting for pivoting the backrest, said fitting comprising a first fitting part, a second fitting part rotatable relative to said first fitting part about a rotational axis, a ring holding together said first fitting part and said second fitting part in the axial direction to form a disc-shaped unit, an adapter bearing against at least a portion of said first fitting part and at least a portion of said ring in an abutting manner to define a connecting surface and a weld seam connecting said adapter to at least one of said first fitting part and said ring, said connecting surface extending in the axial direction with respect to the rotational axis, said seam weld having a weld seam generation direction extending one of along said connecting surface and at a shallow angle relative to said connecting surface, said weld seam extending along at least a portion of said connecting surface.

12. The fitting as claimed in claim 11, wherein the connecting surface extends in a peripheral direction, said first fitting part comprising a first fitting part outer surface, said first fitting part outer surface extending in the axial direction with respect to said rotational axis, said ring comprising an inner ring surface, said inner ring surface extending in the axial direction with respect to said rotational axis, said adapter comprising an adapter surface, said adapter surface being aligned with said inner ring surface to define at least a portion of said connecting surface, said weld seam engaging at least a portion of said first fitting part outer surface, at least a portion of said inner ring surface and at least a portion of said adapter surface.

13. The fitting as claimed in claim 12, wherein a dimension of the weld seam in the connecting surface is greater than a dimension of the weld seam extending perpendicular to said connecting surface and different from a dimension of the weld seam in the peripheral direction.

14. The fitting as claimed in claim 11, wherein the first fitting part, the ring and the adapter are mutually connected to one another by means of the weld seam.

15. The fitting as claimed in claim 11, wherein the weld seam is produced by a laser beam or electron beam, which targets the abutment between the adapter and the first fitting part from a direction along the connecting surface or at the shallow angle to the connecting surface.

16. The fitting as claimed in claim 11, wherein the shallow angle is up to ±25° with respect to the connecting surface.

17. The fitting as claimed in claim 11, wherein the ring is pressed onto the first fitting part.

18. The fitting as claimed in claim 11, wherein the ring encompasses the second fitting part.

19. The fitting as claimed in claim 11, wherein the adapter has a receiver portion with a diameter corresponding to the diameter of the first fitting part.

20. The fitting as claimed in claim 11, wherein the adapter is fixedly connected to the first fitting part and fastens the fitting to the seat part and the second fitting part fastens the fitting to the backrest.

* * * * *